United States Patent [19]

Hard

[11] Patent Number: 5,437,848
[45] Date of Patent: Aug. 1, 1995

[54] RECOVERY OF METAL VALUES FROM PROCESS RESIDUES

[75] Inventor: Robert A. Hard, Oley, Pa.

[73] Assignee: Cabot Corporation, Boston, Mass.

[21] Appl. No.: 911,435

[22] Filed: Jul. 10, 1992

[51] Int. Cl.⁶ .................. C01G 56/00; C01G 57/00
[52] U.S. Cl. ........................ 423/7; 423/11; 423/63; 423/65; 423/68; 423/17; 423/18; 423/16
[58] Field of Search ............. 423/7, 11, 63, 65, 68, 423/17, 18, 16

[56] References Cited

U.S. PATENT DOCUMENTS

| | | | |
|---|---|---|---|
| 2,767,047 | 10/1956 | Wilhelm | 23/23 |
| 3,117,833 | 1/1964 | Pierret | 23/19 |
| 3,653,850 | 4/1972 | Eberts | 23/312 ME |
| 3,658,511 | 4/1972 | Gustison | 75/101 R |
| 3,712,939 | 1/1973 | Capps et al. | 423/63 |
| 3,972,710 | 8/1976 | Meyer | 75/101 |
| 4,155,982 | 5/1979 | Hunkin et al. | 423/7 |
| 4,164,417 | 8/1979 | Gustison | 75/84 |
| 4,233,278 | 11/1980 | Korchnak | 423/321 |
| 4,278,640 | 7/1981 | Allen et al | 423/10 |
| 4,293,528 | 10/1981 | Paul | 423/7 |
| 4,309,389 | 1/1982 | Meyer | 423/63 |
| 4,320,093 | 3/1982 | Volesky et al. | 423/6 |
| 4,412,861 | 11/1983 | Kreuzmann | 75/84.1 R |
| 4,446,116 | 5/1984 | Krismer et al. | 423/63 |
| 4,451,438 | 5/1984 | Floeter et al. | 423/20 |
| 4,490,340 | 12/1984 | Ritsko et al. | 423/65 |
| 4,652,432 | 3/1987 | Worthington et al. | 423/10 |
| 4,778,663 | 10/1988 | Rickelton | 423/10 |
| 4,910,011 | 3/1990 | Dorr et al. | 423/522 |
| 4,923,507 | 5/1990 | Silva | 423/68 |
| 4,968,504 | 11/1990 | Rourke | 423/7 |
| 4,975,264 | 12/1990 | Franken | 17/69 |
| 5,023,059 | 6/1991 | Bielecki et al. | 423/9 |

Primary Examiner—Donald P. Walsh
Assistant Examiner—Meena Chelliah
Attorney, Agent, or Firm—David J. Koris

[57] ABSTRACT

A process for recovering metal and acid values from a source material containing metallic fluorides comprises digesting the source material in sulfuric acid to form a slurry, separating a fluoride containing solid phase and a metal containing first liquid phase. The solid phase is subjected to pyrohydrolysis, sulfuric and hydrofluoric acids are recovered, and the first liquid phase is processed to recover the metal values by solvent extraction or ion exchanges. The tantalum values are extracted from the first liquid aqueous phase by a water immiscible organic extractant such as methylisobutyl ketone to form a first liquid organic phase containing tantalum and a second liquid aqueous phase. The tantalum is stripped from the first organic phase using water. The process includes the additional steps of heating the separated solid phase from about ambient temperature to an elevated temperature in the presence of water vapor to evolve sulfuric acid and render the gangue chemically inert. When the source material contains uranium the digestion step reduces the amount of gangue present in the radioactive source. The process can include the additional steps of removing uranium from the second liquid aqueous phase by either an ion exchange resin or by solvent extraction using a water immiscible organic extractant to yield a uranium depleted aqueous phase which can be treated with an aqueous solution of calcium oxide. Sulfuric acid and the organic extractant for extracting uranium can be recycled if desired.

24 Claims, 2 Drawing Sheets

5,437,848

RECOVERY OF METAL VALUES FROM PROCESS RESIDUES

FIELD OF THE INVENTION

The present invention relates generally to the recovery of metal values, particularly to the recovery of tantalum, and to the recovery of acid values from certain residues which contain naturally occurring radioactive elements such as uranium.

BACKGROUND OF THE INVENTION

There are numerous proposed schemes by which various natural ores, concentrates and slags may be processed for the recovery of metal values. Commercial schemes for the extraction and separation of tantalum and niobium values from beneficiated ores or from tin slags, are described in detail in U.S. Pat. Nos. 2,767,047; 2,953,453; 2,962,372; 3,117,833; 3,300,297; 3,658,511; 3,712,939 and 4,164,417. In these prior processes, feed solids were generally digested with hot, concentrated hydrofluoric acid to solubilize most of the tantalum and niobium values as fluorides. A liquor containing the dissolved metal values is separated from the undissolved solids and is treated in a multistage liquid-liquid extraction cascade wherein the metal values are extracted with methylisobutyl ketone (MIBK). The residue from the acid digestion process contains insoluble metals such as uranium and thorium, and also contains within the entrained insoluble matter quantities of dissolved tantalum and niobium. Stockpiling of these source materials results in the loss of revenues from the unrecovered metal values.

A general discussion of other ore process schemes is found in *Extractive Metallurgy of Niobium, Tantalum and Vanadium*, INTERNATIONAL METALS REVIEW, 1984, vol. 29, No. 26, BB 405–444, published by The Metals Society (London) and in *The Encyclopedia Of Chemical Technology*, 3rd ed., Vol. 22 pp 547–550.

Commonly assigned U.S. Pat. No. 5,023,059, entitled "Recovery of Metal Values and Hydrothoric Acid from Tantalum and Columbian Waste Sludge" also discloses a method for the recovery of tantalum.

It is believed, therefore, that a process that would recover metal values from source materials that contain such metal values as complexed fluorides, that would provide for the recovery of acids from the source materials that would produce a solid waste residual which is non-hazardous under all EPA listings and characteristic tests, and low enough in uranium and thorium content to be suitable for disposal as low-level radioactive waste, would constitute a desirable advancement in the art.

It is an object of this invention to provide an efficient process for the recovery of metal values from source materials of the dissolution of ores and concentrates.

It is another object of this invention to provide an improved process for the recovery of metal values from dilute aqueous process streams.

It is a further object of this invention to recover portions of the sulfuric acid and hydrofluoric acid streams.

It is still another object of the present invention to provide a metal values recovery process, suitable for handling dilute source solids, that will generate solid and liquid waste products that are non-hazardous under EPA's toxic characteristic leaching procedure and all other EPA hazardous characteristics and listing, and that can therefore be disposed of legally either as low-level radioactive waste or as non-hazardous, non-radioactive waste.

It is yet a further object of the present invention to provide an efficient process for the recovery of metal values from source material of the dissolution and concentrates which results in reduced quantities of solid and liquid waste products.

Accordingly, the present invention comprises a process for recovering metal values from a source material containing at least tantalum or niobium and metallic fluorides where the source material is digested with sulfuric acid to form a slurry. The slurry, upon separation, has both a solid and a first liquid aqueous phase. The liquid phase is contacted with a water immiscible organic liquid suitable for extracting tantalum values. A first organic phase bearing tantalum values and a second aqueous phase bearing uranium values is formed. The first organic phase is contacted with an aqueous liquid such as water to form a third aqueous phase containing the tantalum values. Tantalum values are then recovered from the third aqueous phase.

In an alternative embodiment, the separated solids from the digested source material are subjected to pyrohydrolysis. This process provides for the recovery of sulfuric and hydrofluoric acids from the solids and renders the leftover solid residuals non-hazardous under EPA listings and characteristic test, and therefore permissible for disposal as low level radioactive waste.

In another embodiment, the uranium bearing second liquid aqueous phase is brought into contact with an ion exchange resin to form a uranium depleted phase.

DETAILED DESCRIPTION

For a better understanding of the present invention together with other and further objects and advantages, reference is made to the following detailed description and appended claims in connection with the above summary of the invention and the brief description of the drawings.

Figure 1:
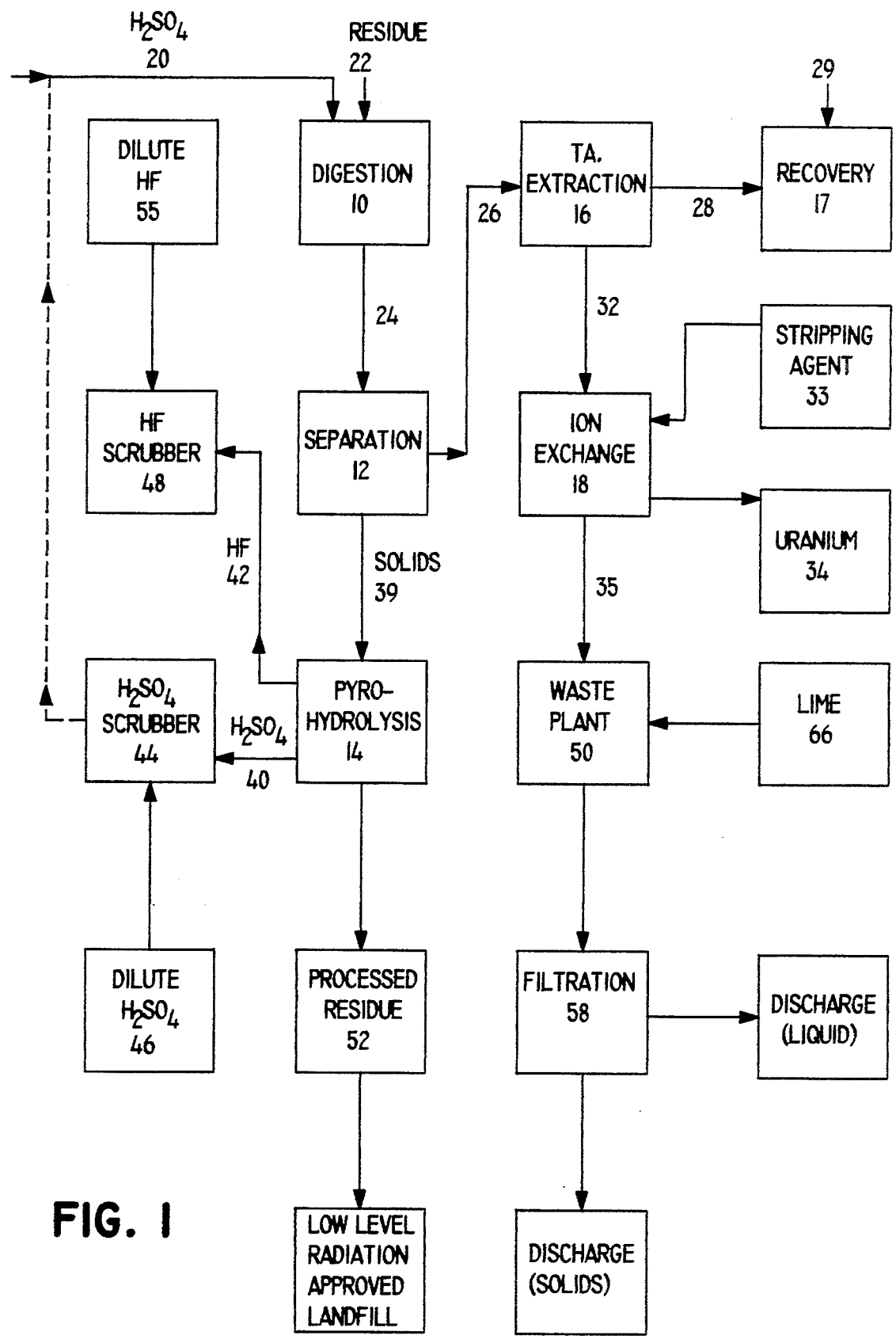
FIG. 1 is a schematic block diagram showing an integrated system for recovering metal values from source materials according to the process of the present invention.

As best seen in FIG. 1, the process of the present invention is performed in a system, which includes: a digestion step 10, a separation step 12, an extraction and concentration step 16 and a metal recovery step 17. A pyrohydrolysis step 14 provides for the recovery of sulfuric and hydrofluoric acids while rendering the solids suitable for low level radioactive disposal. The digestion step reduces the quantity of gangue materials in the radioactive source. Either an ion exchange step 18 or alternatively, a solvent extraction process, illustrated in FIG. 2, can be used to remove uranium which can be followed by a lime treatment step to provide a safe manner for disposing of remaining liquids and solids.

The present invention provides an efficient process for the recovery of metal values, particularly tantalum from solids containing metallic fluorides, such as source materials resulting from the processing of ores and concentrates.

Typical source materials that can be processed by this invention are shown in Table 1.

TABLE 1

TYPICAL SOURCE MATERIAL
Percent by Weight

| Sample No. | 1 | 2 | 3 | 4 |
|---|---|---|---|---|
| Ta (water soluble) | 4.15% | 2.63% | 1.75% | 2.11% |
| Cb (water soluble) | 2.55% | 1.92% | 2.47% | 2.53% |
| Ta (water insol.) | 0.17% | 0.64% | 0.43 | 1.50% |
| Cb (water insol.) | 0.17% | 0.63% | 0.43% | 1.50% |
| Ca | 13.30% | 13.20% | 7.40% | 21.70% |
| Al | 13.30% | 11.10% | 6.50% | 5.70% |
| Fe | 1.70% | 4.60% | 1.70% | 0.90% |
| Ti | 0.30% | 0.70% | 0.30% | 0.80% |
| F | 42.50% | 46.00% | 39.20% | 35.10% |
| $SO_4$ | 0.30% | 0.20% | 0.30% | 0.50% |
| C | 1.00% | 0.60% | 1.30% | 1.20% |
| Cr | 0.10% | 0.30% | 0.50% | 1.20% |
| Pb | 0.01% | 0.02% | 0.00% | 0.30% |
| Mg | 2.10% | 2.30% | 2.10% | 1.30% |
| Ba | 0.30% | 1.00% | 2.00% | 1.70% |
| Zr | 5.40% | 6.40% | 5.30% | 2.70% |
| Sn | 0.50% | 0.50% | 0.30% | 2.40% |
| Th | 0.50% | 0.70% | 0.50% | 0.30% |
| U | 0.20% | 0.20% | 0.10% | 0.20% |

With particular reference to FIG. 1, in the first step of the process, sulfuric acid 20 is thoroughly mixed with a slurry of a source material 22, in a ratio of from about 0.3 to about 0.5 parts by weight of commercial concentrated sulfuric acid per 1 part by weight of solids in the slurry. The slurry is maintained at about 70° C. to about 100° C. for at least about 5 minutes and preferably 30 minutes. While lower temperatures including ambient, can be used, the time period for digestion is increased. Higher temperatures result in increased fuming activity.

The slurry 24 is separated at 12 by known methods such as by filter press to form a first aqueous liquid phase 26 containing metal values such as tantalum and a solid phase.

When the source materials shown in Table 1 were processed, the resulting liquid phase 26 typically contained from about 3 to about 8 grams of tantalum per liter. In operation, a first liquid aqueous phase 26 was contacted with a water immiscible liquid organic extractant suitable for extracting tantalum, such as MIBK, in extraction unit 16. A first organic liquid phase 28 containing tantalum values and a second liquid aqueous phase 32 were formed and separated by conventional methods of separating immiscible liquids. Tantalum and/or Niobium values were concentrated in a first organic extractant 28 to about 5 times the concentration present in the first aqueous phase 26. Phase volumes ratios were adjusted so that the extractant phase was one fifth less than the feed phase. Other methods known in the art may also be applied to increase concentration and to extract metal values. In order to completely remove at least the tantalum and niobium values, a free acid normality of greater than 4 is desired. A strong acid such as HCl or $H_2SO_4$ is preferred. Complexed fluorides of tantalum and fluoride can be recovered by methods known in the art from the first organic liquid phase 28 such as by stripping with water 29. The solution containing the tantalum can be processed by conventional tantalum processing to produce tantalum of commercial purity. Niobium, if present, can also be recovered from the extractant by conventional techniques known to those skilled in the art.

The second liquid aqueous phase 32 resulting from the tantalum extraction unit 16 can be treated by an ion exchange resin in unit 18 to remove the uranium. The second liquid aqueous phase 32 generally will contain a concentration of uranium from about 0.05 to about 0.3 grams per liter. The ion exchange resin is stripped preferably with sulfuric acid 33. Other stripping agents known to those skilled in the art can be used. The stripping step yields an aqueous solution 34 having a concentration of about 10 grams per liter to about 30 grams per liter of uranium. This solution can be further processed to yield purified uranium. The uranium depleted phase 35 can be sent to a waste treatment plant 50 for lime 66, and filtration treatment at 58, and final disposal.

Figure 2:
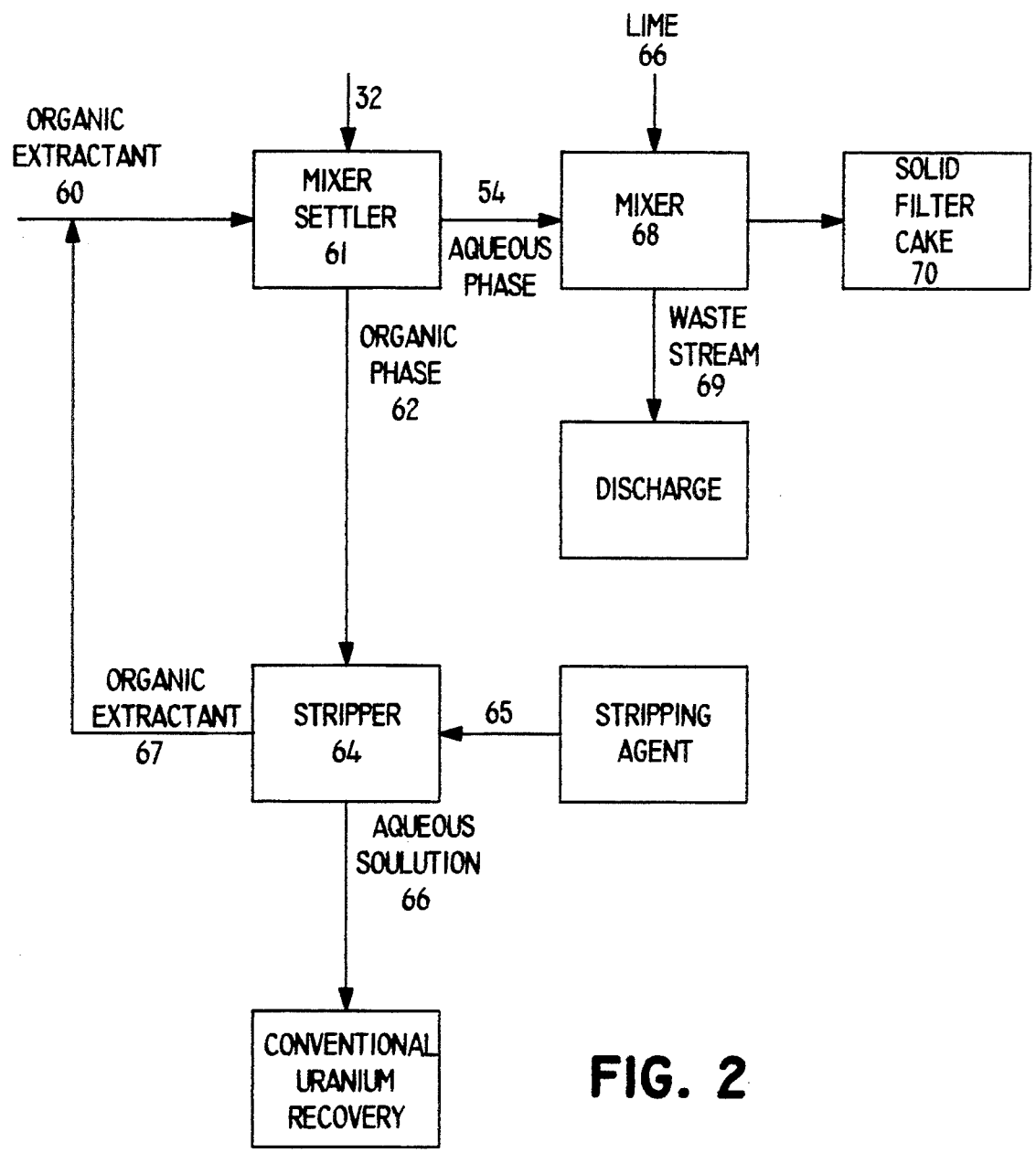
FIG. 2 is a schematic block diagram showing a solvent extraction process for the removal of uranium from one of the streams of the metal value recovery process.

Alternatively, the second liquid aqueous phase 32 containing the above-mentioned concentration of uranium can be processed by solvent extraction in accordance with the process of FIG. 2. A water immiscible organic extractant 60 typically comprising an organophosphate in a water-immiscible organic solvent is used to extract essentially all of the uranium. A preferred extractant is a mixture of di-2-ethylhexyl phosphoric (DEPA) and trioctyl phosphine oxide (TOPO). While various concentrations of the foregoing extractants can be used, it is preferred to use a mixture of 0.9 Molar DEPA and 0.13 Molar TOPO in a suitable organic solvent, such as kerosene. This organic extraction solution is used to contact second aqueous phase 32 in a mixer settler unit 61 to form an organic phase containing essentially all the uranium 62, and an aqueous phase containing only very low levels of uranium, 54. After settling, phases 54 and 62 are separated. The organic phase 62 is transferred to a stripping unit 64. A stripping agent such as an aqueous ammonium bicarbonate solution 65 is used to strip the uranium from the extractant solution to form an aqueous solution 66 containing a concentration of uranium of from about 2 to about 20 grams per liter which can be processed by techniques known to those skilled in the art for recovering uranium such as set forth in the *Encyclopedia of Chemical Technology*, Supra, vol 23, pp 520–526. While ammonium bicarbonate is preferred, other stripping agents such as phosphoric acid containing sufficient ferrous iron ions to reduce the uranium to the $U^{+4}$ state can also be used. The uranium depleted aqueous phase 54 is treated with lime 66 and separated, for example, by filtration to yield an effluent stream 69 which contain essentially no uranium. The solid filter cake is suitable for disposal as hazardous, non-radioactive industrial waste. Typical analyses of the solids 70 after lime treatment of the process illustrated in FIG. 2 are shown in Table 2 below:

TABLE 2

ANALYSIS OF PROCESSED SOLIDS

| Element | Limit, ppm | Unprocessed Sample | SAMPLE | | |
| | | | A | B | C |
| | | | ppm | | |
|---|---|---|---|---|---|
| Ag | 5.0 | u | 0.7 | u | u |
| As | 5.0 | 5.2 | 0.6 | u | u |
| Ba | 10.0 | u | u | 1.77 | 1.33 |
| Cd | 1.0 | u | u | u | u |
| Cr | 5.0 | 29.5 | u | u | u |
| Hg | 0.2 | u | u | u | u |
| Pb | 5.0 | 19.3 | 1.5 | u | u |
| Se | 1.0 | u | u | u | u | u = undetected on the basis of Toxic Characteristic Leaching Procedure, Method 1311, EPA 40CFR 261.

Regarding FIG. 1, the solid phase 39, containing sulfate and fluoride ions is separated from the liquid phase and is subjected to pyrohydrolysis as follows: first, the solid phase is fed to a kiln 14 and is heated in the presence of water vapor from about ambient temperature to an elevated temperature of at least about 700° C. While temperatures as low as 700° C. can be used, it is preferred to use higher temperatures such as about 1200° C. in order to reduce the product volume. Water vapor is preferably provided by the combustion gases that result from providing heat to the pyrohydrolysis step 14. Alternatively, the water vapor can be supplied. Gaseous sulfuric acid 40 and hydrofluoric acid 42 are formed. Gaseous sulfuric acid 40 is condensed by a first scrubber 44 utilizing dilute sulfuric acid 46. Gaseous hydrofluoric acid 42 is condensed in a second scrubber 48 utilizing dilute hydrofluoric acid 55. The solids generated 52 from the process of this invention are chemically inert. The term "chemically inert" is defined herein as non-hazardous under EPA listings and characteristic tests and are suitable for disposal as low level radioactive waste. An average reduction in low level radioactive solids 52 of about 30 to 50 percent from the dry weight per quart of residual solids 22 is obtained by the present invention. The recovered sulfuric acid 20 can be recycled to treat the incoming sludge if desired. Additionally, if metal values other than tantalum are present in the metallic fluoride containing residues, the metals can be solubilized using sulfuric acid. An aqueous solution is separated from the solids and the first liquid phase 26 is treated to remove the particular metal desired by means known in the art such as ion exchange or solvent extraction. In such instances, the solids are further processed to provide acid recovery as described above.

To more fully explain the preferred embodiments of the invention the following non-limiting detailed example is presented. All parts, proportions and percentages are by weight unless otherwise indicated.

EXAMPLE

Using the process as illustrated by FIG. 1 about 65,000 parts of a secondary residue containing 40% water are digested with about 13,650 parts of concentrated sulfuric acid and 26,000 parts of water for about 30 minutes at about 75° C. Thereafter, the resulting two phase mixture is separated using a high pressure plate and frame filter press.

The high pressure filter press operation results in a filter cake of solids containing about 35% moisture. The cake is placed onto a conveyor belt which feeds a sintering kiln. The cake, after going through a breaker is screw-fed to the kiln which is about 3 feet in diameter and about 25 feet long and is lined with a high temperature alumina refractory. The cake is heated to about 1200° C. resulting in the evolution of a major portion of the HF and $H_2SO_4$ as gases. These gases upon exiting the kiln are sprayed with water in a chamber to remove entrained solids, after which, the gases are scrubbed in two scrubbers which first recover the sulfuric acid by scrubbing with a dilute solution of sulfuric acid and secondly recovering the HF as a 40% solution by scrubbing with an initially dilute solution of HF until the concentration increases to the 40% level. The gases, depleted of the majority of the acids, are then sent to a final scrubber to be scrubbed with a sodium hydroxide solution to remove essentially all of the remaining HF before discharging the gas to the atmosphere. About 1,170 parts of HF are recovered from the 39,000 parts of secondary residue. About 25,000 parts of solids are discharged from the kiln.

The filtrate from the filter press has a concentration of metal values tantalum oxide and niobium oxide of from about 3 to about 8 grams per liter each. It also contains uranium oxide at a concentration of from about 0.02 to about 0.06 grams per liter. Tantalum and niobium are extracted from the flitrate using MIBK as an extractant. About 680 parts of tantalum oxide and 710 parts of niobium oxide are recovered by stripping from the extractant with water.

About 25 parts of uranium can be removed from the tantalum depleted material by either ion exchange or by solvent extraction.

When ion exchange is used, the tantalum depleted phase is brought into contact with an ion exchange resin to remove the uranium and the uranium values are stripped from the ion exchange resin by sulfuric acid.

When solvent extraction is used, the tantalum depleted phase is brought into contact with an organic extractant that is selective for uranium as is known in the art. A preferred extractant is a mixture of 0.9M DEPA and 0.13M TOPO in kerosene as was previously described. Ammonium bicarbonate solution is used to strip the uranium values from the extractant. A concentration of about 0.5 moles per liter of ammonium bicarbonates is introduced to the organic extractant. An ammonium bicarbonate solution having a concentration of about 2 to about 20 grams per liter of uranium is obtained which can be further processed by conventional uranium recovery methods. The pH is adjusted by conventional means to between about 8.4 to 8.65. For a flow of extract (organic phase) of 3 gpm, the stripped extractant flow rate would be about 0.04 gpm. The stripped organic extractant is recycled into the mixer settler. The streams from which the uranium has been removed are treated with an aqueous solution of lime having a concentration of about 200 grams of lime per liter and filtered. The effluent stream, with essentially no uranium may be discharged as non-hazardous, non-radioactive industrial waste. The solid filter cake is composed of calcium fluoride and calcium sulfate and is chemically inert.

While there has been shown and described what are considered to be the preferred embodiment of this invention, various changes may become apparent to those skilled in the art. These embodiments are not presented as limiting the invention but are set forth as an explanation of the invention which is defined by the appended claims.

What is claimed is:

1. A process for recovering metal values from a source material containing at least tantalum and metallic fluorides comprising:
    (a) digesting the source material in sulfuric acid to form a slurry;
    (b) separating the slurry to form at least a first liquid aqueous phase containing tantalum and a solid phase;
    (c) contacting the first liquid aqueous phase with a water immiscible organic liquid extractant suitable for extracting tantalum to form a first organic liquid phase containing tantalum values and a second liquid aqueous phase; and
    (d) recovering the tantalum values from the first organic aqueous phase.

2. A process for recovering metal values from a source material containing at least niobium and metallic fluorides comprising:
   (a) digesting the source material in sulfuric acid to form a slurry;
   (b) separating the slurry to form at least a first liquid aqueous phase containing niobium and a solid phase;
   (c) contacting the first liquid aqueous phase with a water immiscible organic liquid extractant suitable for extracting niobium to form a first organic liquid phase containing niobium values and a second liquid aqueous phase; and
   (d) recovering the niobium values from the first organic aqueous phase.

3. A process for recovering metal values from a source material containing at least tantalum and metallic fluorides comprising:
   (a) digesting the source material in sulfuric acid to form a slurry;
   (b) separating a first liquid aqueous phase containing tantalum and a solid phase from the slurry;
   (c) contacting the first liquid aqueous phase with a water immiscible organic liquid extractant suitable for extracting tantalum to form a first organic liquid phase containing tantalum values and a second liquid aqueous phase;
   (d) contacting the first organic phase with an aqueous liquid to form a third aqueous phase containing the tantalum values; and
   (e) recovering the tantalum values from the third aqueous phase;
   (f) pyrohydrolyzing the separated solid phase by raising the temperature of the solids from about ambient temperature to at least about 700° C. in the presence of water vapor to evolve gaseous sulfuric acid, and gaseous hydrofluoric acid, and a chemically inert residue.

4. A process in accordance with claim 1 wherein the slurry is maintained at a temperature ranging from about 70° C. to about 100° C.

5. A process in accordance with claim 3 wherein the slurry is maintained at a temperature ranging from 70° C. to about 100° C. for a period greater than 5 minutes.

6. A process in accordance with claim 4 where said source material contains at least 1% by weight of tantalum or niobium:
   (a) pyrohydrolyzing the separated solid phase by raising the temperature of the solids from about ambient temperature to at least about 800° C. in the presence of water vapor to evolve gaseous sulfuric acid and gaseous hydrofluoric acid and generate chemically inert residue;
   (b) scrubbing the gas with a dilute solution of sulfuric acid to remove sulfuric acid values, and
   (c) scrubbing the gas with a dilute solution of hydrofluoric acid to remove hydrofluoric acid values.

7. A process in accordance with claim 5 wherein said first aqueous phase contain from about 3 to about 8 grams of tantalum per liter.

8. A process in accordance with claim 6 wherein said slurry is comprised of about 0.3 to about 0.5 parts by weight sulfuric acid for each part by weight of source material.

9. A process in accordance with claim 6 wherein said water immiscible organic liquid extractant is MIBK:
   (a) bringing the second liquid phase containing uranium into contact with an ion exchange resin to remove the uranium from the second liquid phase to form an uranium depleted phase, and
   (b) stripping the uranium values from the ion exchange resin.

10. A process in accordance with claim 6 wherein said third aqueous phase tantalum values are separated by stripping with water.

11. A process in accordance with claim 9 which includes:
    (a) adding lime to the uranium depleted phase, and
    (b) separating the resulting wet solids from liquids.

12. A process in accordance with claim 3 wherein the source material contains uranium and said process includes:
    (a) bringing the second liquid aqueous phase containing uranium into contact with an ion exchange resin to remove the uranium from the second liquid phase to form an uranium depleted phase, and
    (b) stripping the uranium values from the ion exchange resin.

13. A process in accordance with claim 12 which includes:
    (a) adding lime to the uranium depleted phase, and
    (b) separating the resulting wet solids from liquids.

14. A process in accordance with claim 1 wherein the source material contains uranium and the process includes:
    (a) contacting the second liquid aqueous phase with a water immiscible extractant solution comprising an organo-phosphate extractant in an organic solvent to remove at least a major portion of the uranium values from the aqueous phase to form an uranium depleted liquid aqueous phase and an organic phase containing the removed uranium, and
    (b) stripping the uranium from the organic phase.

15. A process in accordance with claim 11 wherein the uranium is stripped from ion exchange resin by an aqueous solution of ammonium bicarbonate.

16. A process in accordance with claim 3 wherein the source material contains uranium and the process includes:
    (a) contacting the second liquid aqueous phase with a water immiscible extractant solution comprising an organo-phosphate extractant in an organic solvent to remove at least a major portion of the uranium values from the aqueous phase to form an uranium depleted liquid aqueous phase and an organic phase containing the removed uranium, and
    (b) stripping the uranium from the organic phase.

17. A process in accordance with claim 2 wherein the source material contains uranium and the process includes:
    (a) contacting the second liquid aqueous phase with a water immiscible extractant solution comprising an organo-phosphate extractant in an organic solvent to remove at least a major portion of the uranium values from the aqueous phase to form an uranium depleted liquid aqueous phase and an organic phase containing the removed uranium, and
    (b) stripping the uranium from the organic phase.

18. A process in accordance with claim 17 which includes:
    (a) adding lime to the uranium depleted phase, and
    (b) separating the resulting wet solids from liquids.

19. A process in accordance with claim 16 wherein the recovered sulfuric acid is recycled to digest the source material.

20. A process in accordance with claim 17 wherein the slurry is maintained at a temperature ranging from about 70° C. to about 80° C. for a period of at least about 30 minutes prior to separation.

21. A process in accordance with claim 11 wherein the organic phase after uranium stripping is recycled to contact the second liquid aqueous phase.

22. A process for recovering metal and acid values from a source material containing metallic fluorides of at least one metal comprising:
   (a) digesting the source material in sulfuric acid to form a slurry;
   (b) separating a first liquid aqueous phase containing metal values and a solid phase from the slurry;
   (c) removing the metal values from the first liquid aqueous phase by using a separation agent selected from a water immiscible organic liquid extractant suitable for extracting the metal values and an ion exchange resin for selectively removing the metal values;
   (d) recovering the metal values from the separation agent;
   (e) pyrohydrolyzing the separated solid phase by raising the temperature the separated solid phase from about ambient temperature to an elevated temperature of at least about 800° C. to evolve sulfuric acid, hydrofluoric acid, and a chemically inert residue;
   (f) scrubbing the gas with a dilute solution of sulfuric acid to remove sulfuric acid values; and
   (g) scrubbing the gas with a dilute solution of hydrofluoric acid to remove hydrofluoric acid values.

23. A process according to claim 22 wherein said elevated temperature is between about 800° C. to about 1200°.

24. A process according to claim 22 which said chemically inert residue is 30% of the dry weight of less than about the source material.

* * * * *